(12) United States Patent
Koehler et al.

(10) Patent No.: US 8,442,723 B2
(45) Date of Patent: May 14, 2013

(54) METHOD FOR ACTIVATING PERSONAL PROTECTION MEANS

(75) Inventors: Armin Koehler, Sachsenheim (DE); Sabine Brandenburger, Stuttgart (DE); Hermann Schuller, Niefern-Örchelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 1386 days.

(21) Appl. No.: 10/583,055

(22) PCT Filed: Jul. 22, 2004

(86) PCT No.: PCT/DE2004/001618
§ 371 (c)(1),
(2), (4) Date: May 8, 2007

(87) PCT Pub. No.: WO2005/061281
PCT Pub. Date: Jul. 7, 2005

(65) Prior Publication Data
US 2007/0272468 A1    Nov. 29, 2007

(30) Foreign Application Priority Data
Dec. 19, 2003    (DE) .................................. 103 60 893

(51) Int. Cl.
*B60R 22/00*    (2006.01)
(52) U.S. Cl.
USPC ........................................... 701/45; 180/282

(58) Field of Classification Search ................ 701/45; 180/282
See application file for complete search history.

(56) References Cited

U.S. PATENT DOCUMENTS

| | | | | |
|---|---|---|---|---|
| 5,014,810 | A  * | 5/1991 | Mattes et al. ............... | 180/268 |
| 6,236,922 | B1 * | 5/2001 | Andres ...................... | 701/45 |
| 6,459,366 | B1 * | 10/2002 | Foo et al. .................. | 340/436 |
| 6,549,836 | B1 * | 4/2003 | Yeh et al. .................. | 701/45 |
| 2003/0197356 | A1 * | 10/2003 | Fischer ..................... | 280/735 |

FOREIGN PATENT DOCUMENTS

| | | |
|---|---|---|
| EP | 0 458 796 | 12/1991 |
| JP | 7-186876 | 7/1995 |
| JP | 2000-168492 | 6/2000 |
| JP | 2001-30873 | 2/2001 |
| JP | 2001-277993 | 10/2001 |
| JP | 2003-220926 | 8/2003 |
| WO | WO 2004/018264 | 3/2004 |

* cited by examiner

*Primary Examiner* — Helal A Algahaim
(74) *Attorney, Agent, or Firm* — Kenyon & Kenyon LLP

(57) ABSTRACT

A method for activating personal protection means using at least one signal derived from an acceleration sensor. A forward displacement is determined from the signal, and the forward displacement is compared to at least one threshold value surface, which is set as a function of a velocity decrease and a deceleration. The personal protection means is activated as a function of the comparison.

20 Claims, 4 Drawing Sheets

METHOD FOR ACTIVATING PERSONAL PROTECTION MEANS

BACKGROUND INFORMATION

European Patent No. EP 458 796 describes a method for activating personal protection means in which a variable threshold for an integrated acceleration value is set as a function of parameters characterizing the crash sequence. The crash sequence and thus the crash type and the crash severity can thus be very accurately analyzed. In particular, the variable threshold is determined as a function of the acceleration, and the decrease in velocity is checked against this threshold.

SUMMARY OF THE INVENTION

The method according to the present invention for activating personal protection means has the advantage over the related art that the method is time-independent. A threshold value surface, which is determined by pairs of velocity decrease and deceleration values, is now used. A forward displacement is assigned to these value pairs in advance, so that a surface is thus defined in the three-dimensional space. This surface is determined empirically. From the acceleration signal, a forward displacement is determined which is compared to this threshold value surface, and only when this threshold value surface is intersected or touched or broken through is a deployment decision made for the personal protection means such as airbag, belt tensioner, or rollover bar. In particular, the method according to the present invention makes the method less sensitive to fluctuations in the recognized crash start. The crash start is recognized in that an acceleration signal exceeds a mostly constant noise threshold. This threshold may be typically between 3 g and 4 g. The noise threshold may be variable, for example, as a function of a pre-crash sensor's signals. Therefore, when the acceleration exceeds this noise threshold, integration starts and the crash is thus defined. To eliminate erroneous deployment events such as the typical hammer blow, hitting the curb or a pothole, the threshold value surface is typically raised for a certain time after the crash start to eliminate such rapidly decaying events. A crash is assumed if an acceleration value higher than the noise threshold still exists thereafter.

It is particularly advantageous that the threshold value surface is simulated by two threshold values, the first threshold value being determined as a function of a velocity decrease and then measured using the instantaneous forward displacement, and the second threshold value being set as a function of the deceleration, i.e., the acceleration, the forward displacement also being compared to this second threshold value. This is a simple implementation of the teaching according to the present invention.

It is furthermore advantageous that the threshold value surface is modified as a function of a signal of an external sensor system or of at least one characteristic value. Signals from external sensors such as upfront sensors, side impact sensors, seat occupancy sensors, or environment sensors may be used for influencing the threshold value surface. In the event of an unavoidable collision, for example, which has been recognized by the environment sensor system, the threshold value surface is suitably lowered to achieve rapid deployment of the personal protection means. However, characteristic values determined by a sensor system within an airbag control unit, such as crash type and crash severity, may also be used for influencing the threshold value surface. In the event of a particularly severe crash, the threshold value surface may be suitably lowered to achieve the earliest possible analysis of the personal protection means.

The threshold value surface may also be modified as a function of a crash phase. In the first phase, as indicated above, in the hammer blow phase, the threshold value surface is raised to prevent deployment, and in the subsequent phase it is lowered to then detect a possible crash. After a certain time or a certain forward displacement or a certain velocity decrease, the threshold value surface may be raised again to prevent the deployment of personal protection means in the event of a very slow crash. If the velocity decrease is monitored, it is then possible that, after reaching a certain velocity decrease, a counter is set and it is checked after a predefined time whether the forward displacement has broken through the threshold value surface. Furthermore, different crash phases may be constructed directly via threshold values on the basis of the decreased velocity or the forward displacement that has occurred; a timer (counter) may thus be omitted and time-independence is ensured. If this is not the case to that point, the threshold value surface is raised to prevent deployment in the event of a soft crash.

To increase the robustness of the method according to the present invention, the forward displacement and/or the velocity decrease are each advantageously compared to their own threshold value. This threshold value is constant over time, for example, and should deal with those cases in which no activation of the personal protection means occurs due to the analysis of the threshold value surface, but activation should occur due to the crash.

The forward displacement may be advantageously estimated from the deceleration and the velocity decrease by expanding into a series, preferably into a Taylor series. This estimate may also take place into the future in particular, so that the time of deployment may thus be determined for the future in a simple manner.

DETAILED DESCRIPTION

Deployment algorithms for activating personal protection systems are essentially based on signals obtained via acceleration sensors. Signals from environment sensors, pressure sensors, in particular for side impact sensing, and signals from sensors for seat occupancy recognition may also be used. The acceleration sensors may be situated in the control unit, which is usually located in the area of the transmission tunnel, or may also be used as side impact sensors or front impact sensors. Front impact sensors are usually attached to the radiator grill, while the side impact sensors are situated in the B pillar or the transverse seat support. The acceleration signals are first compared to a noise threshold. This is necessary to suppress harmless vibrations due to potholes or other events. This results in uncertainties in defining the crash start. It has been proposed previously that the noise threshold be influenced as a function of sensor signals.

It is, however, provided according to the present invention that the deployment algorithm be time-independent. This is achieved by defining a threshold value surface via pairs of deceleration, velocity decrease, and forward displacement values. This threshold value surface is then compared with the forward displacement resulting from the measured values. If the threshold value surface is broken through, touched, or intersected, a crash requiring deployment of personal protection means may be assumed. The threshold value surface may be modified by refinements as a function of characteristic values such as crash severity or crash type, as well as signals of external sensors such as upfront, pre-crash, or side impact sensors to adaptively respond to the particular circumstances.

Figure 1:
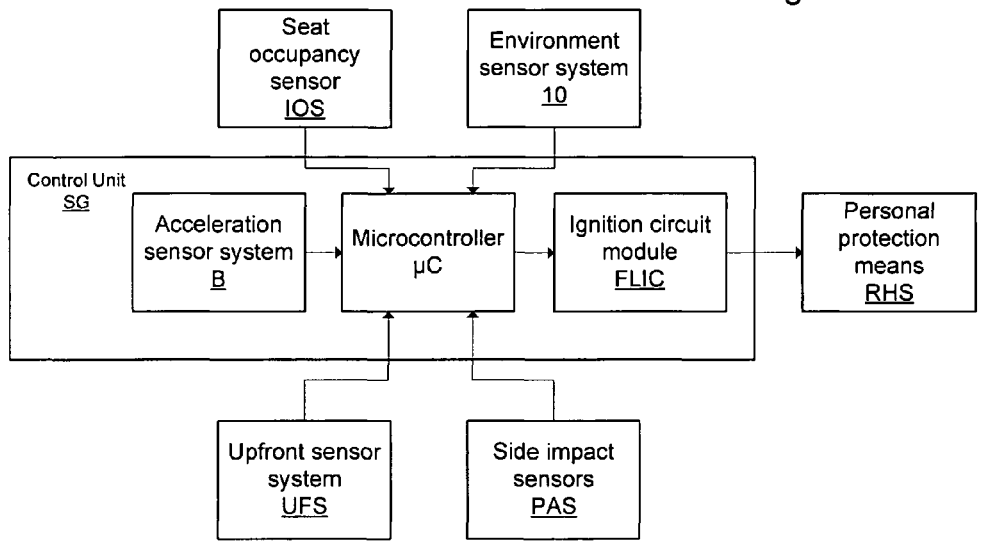
FIG. 1 shows a block diagram of the device according to the present invention.

FIG. 1 shows a device which uses the method according to the present invention. A control unit SG has a microcontroller µC, which may also be another processor type, to whose first data input an acceleration sensor system B located within control unit SG is connected. Acceleration sensor system B measures, for example, in the longitudinal and transverse directions of the vehicle; the acceleration sensors may also be situated at an angle to these directions. Microcontroller µC is connected to an ignition circuit module FLIC via a first data output. Ignition circuit module FLIC is used for igniting the ignition elements. Further details within control unit SG, which are known to those skilled in the art, are omitted here for the sake of simplicity. Ignition circuit module FLIC is connected to personal protection means RHS via an output. An upfront sensor system UFS is connected to a second data input of microcontroller µC. The upfront sensor system includes mostly acceleration sensors attached to the radiator grill. Side impact sensors PAS, which may also be acceleration sensors and/or pressure sensors and are located in the B pillar or in the vehicle door, are connected to a third data input of microcontroller µC. A seat occupancy sensor IOS is connected to a fourth data input of microprocessor µC. Seat occupancy sensor IOS may recognize seat occupancy by measuring weight, for example, using dynamometric bolts or a seat mat, or an interior video sensor or ultrasound or radar sensor may be used. An environment sensor system 10 is connected to a fifth data input of microprocessor µC. Environment sensor system 10 is a combination of ultrasound sensors, radar sensors, and/or video sensors (possibly pedestrian protection contact sensor systems). Radar sensors operate at 77 GHz or 24 GHz in general. Microcontroller µC executes the method according to the present invention. For this purpose, it uses primarily the signals of acceleration sensor system B, which are integrated to obtain a velocity decrease; further integration provides the forward displacement. Forward displacement values are entered in a memory, for example, in look-up tables for certain acceleration and velocity decrease values. Unique points in space are determined via these pairs of acceleration (deceleration), velocity decrease, and forward displacement values; these points together form a surface, namely the threshold value surface. This threshold value surface is then compared with the instantaneous forward displacements to determine whether a deployment case is present.

Figure 2:
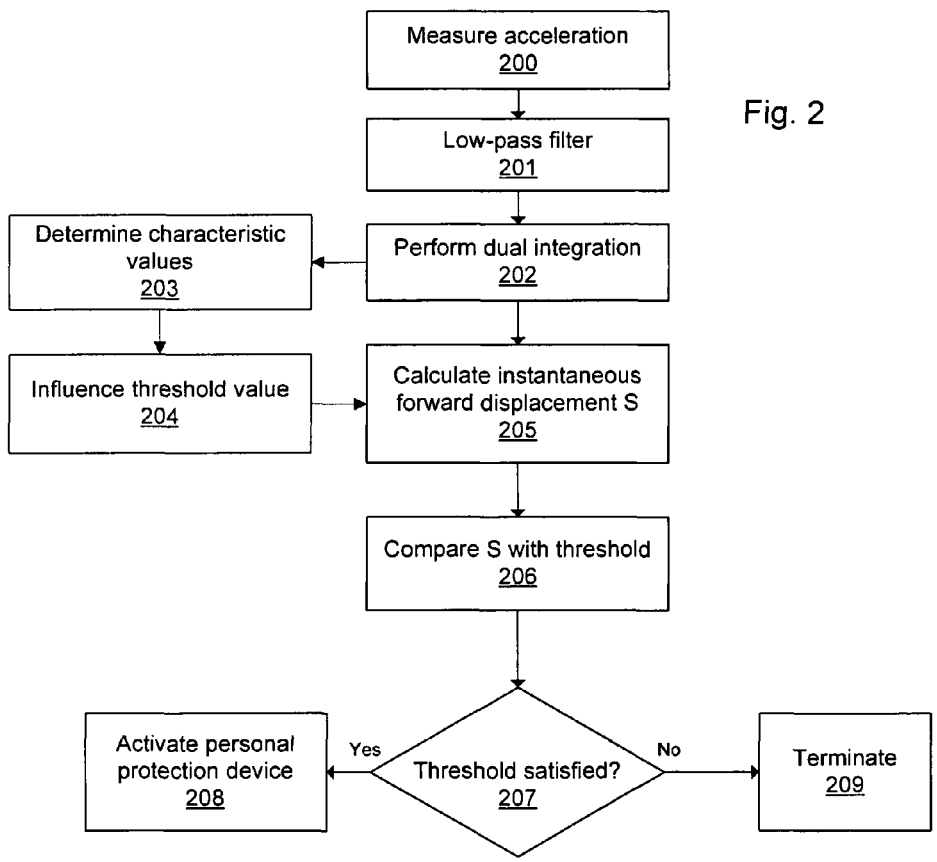
FIG. 2 shows a flow chart.

FIG. 2 shows the method according to the present invention in a flow chart. In method step 200, acceleration A is measured using sensor system B. The acceleration is usually low-pass filtered in method step 201 to perform single and dual integration in method step 202. In method step 203, characteristic values such as crash type or crash severity may be determined from the acceleration or deceleration, velocity decrease, and forward displacement. These are then ready, in method step 204, to influence the threshold value surface if necessary. Instantaneous forward displacement S, which occurs and may be determined in method step 205 using expansion into a Taylor series according to the following formula:

$$S(t_0 + \Delta t) = \underset{\int\int a(t)dtdt}{S(t_0)} + v(t_0) + \frac{1}{2}a(t_0) \cdot \Delta t^2$$

$$a(t) = \frac{d}{dt}v(t) = \frac{d^2}{dt^2}s(t)$$

is compared with the threshold value surface in method step 206, and in method step 207 it is determined whether the threshold value surface is broken through and when. If the threshold value surface is broken through at a certain point in time, at this time personal protection means RHS are activated in method step 208. If no contact occurs between the forward displacement and the threshold value surface, the method is terminated in method step 209. Influencing the threshold value surface by additional parameters from the external sensors such as environment sensor system 10, upfront sensor system UFS, and side impact sensor system PAS, as well as seat occupancy sensors IOS, may be added to this method according to the present invention in a simple manner.

Figure 3A:
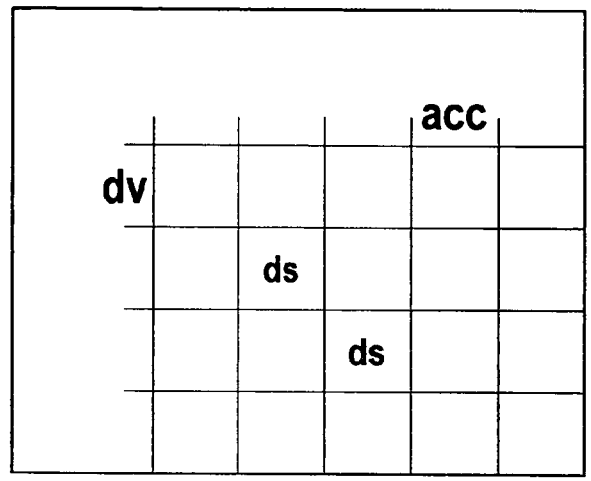
FIGS. 3a and 3b show the threshold value surface.
Figure 3B:
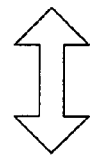
Figure 3B:
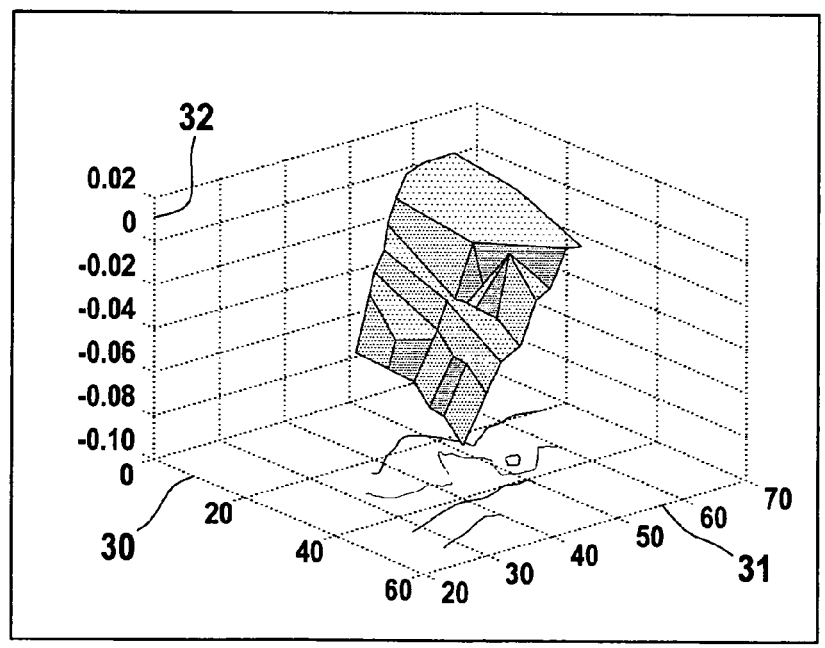

FIGS. 3a and 3b illustrate the aspect and the formation of the threshold value surface. FIG. 3a shows a schematic representation. In the first row acceleration values ACC are plotted on the x axis, and in the first column velocity decrease values are plotted on the y axis. Forward displacement values obtained empirically or via simulation are then stored for these pairs of values. This is then expressed in the surface in space shown in FIG. 3b. The x axis is determined by deceleration values 31, while the y axis is determined by velocity decrease values 30. The z axis is for the forward displacement values. The threshold value lines resulting from the relationship between velocity decrease and deceleration are represented in this plane at forward displacement value 0. An instantaneously determined forward displacement resulting from the measured acceleration would have to break through this surface to allow deployment of the personal protection means. The surface has only one point for each point defined by velocity decrease and deceleration.

Figure 4:
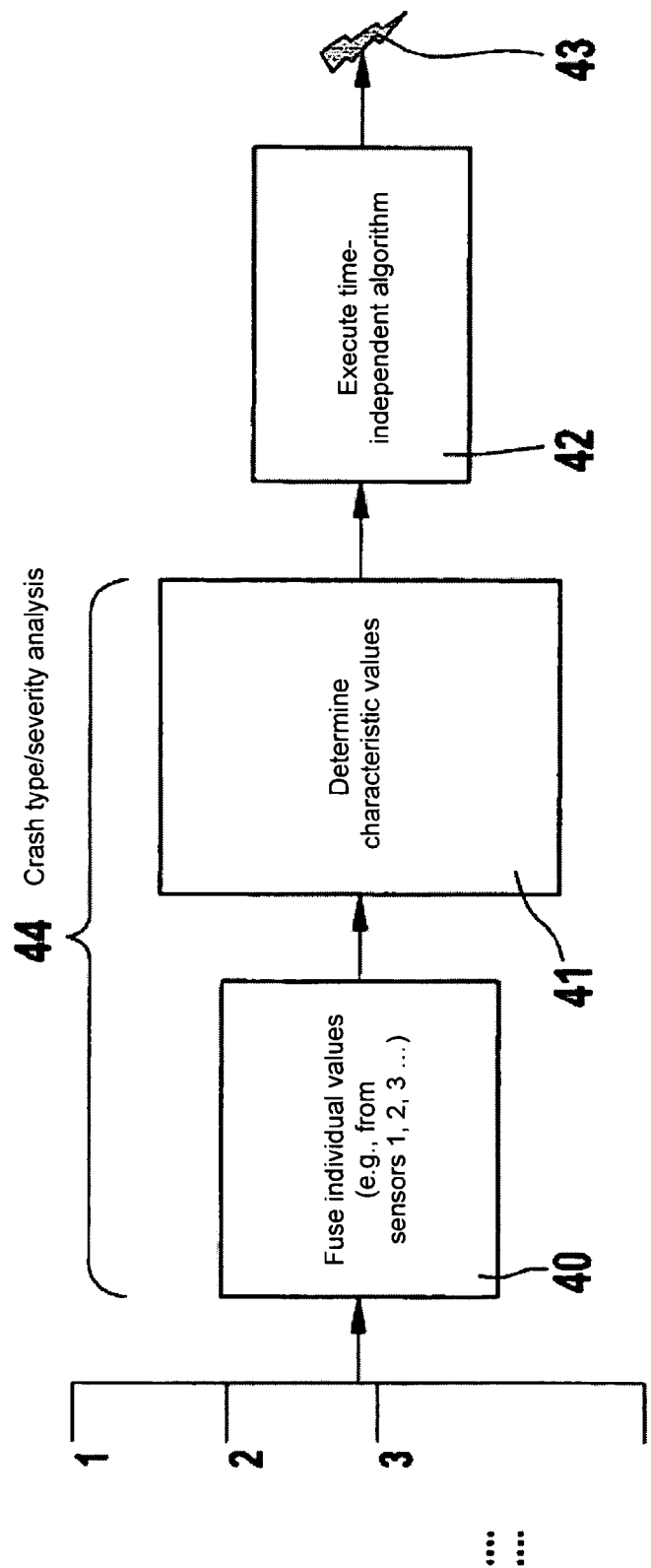
FIG. 4 shows a block diagram.

FIG. 4 shows an overall representation of the deployment algorithm as a block diagram.

Various features are first determined. These may include forward displacement, velocity decrease, and acceleration, which may also be optionally filtered for example. A fusion of features takes place in method step 40 to form relevant characteristic values from the individual values. These characteristic values are determined in method step 41, for example, as a function of time or of the forward displacement or of the decrease in velocity as crash type or crash severity. Crash type and crash severity determination includes blocks 40 and 41, which are combined here by parentheses 44. The time-independent algorithm, which has been disclosed according to the present invention, is then executed in block 42. At time 43, the deployment decision is made about the personal protection means.

Figure 5:
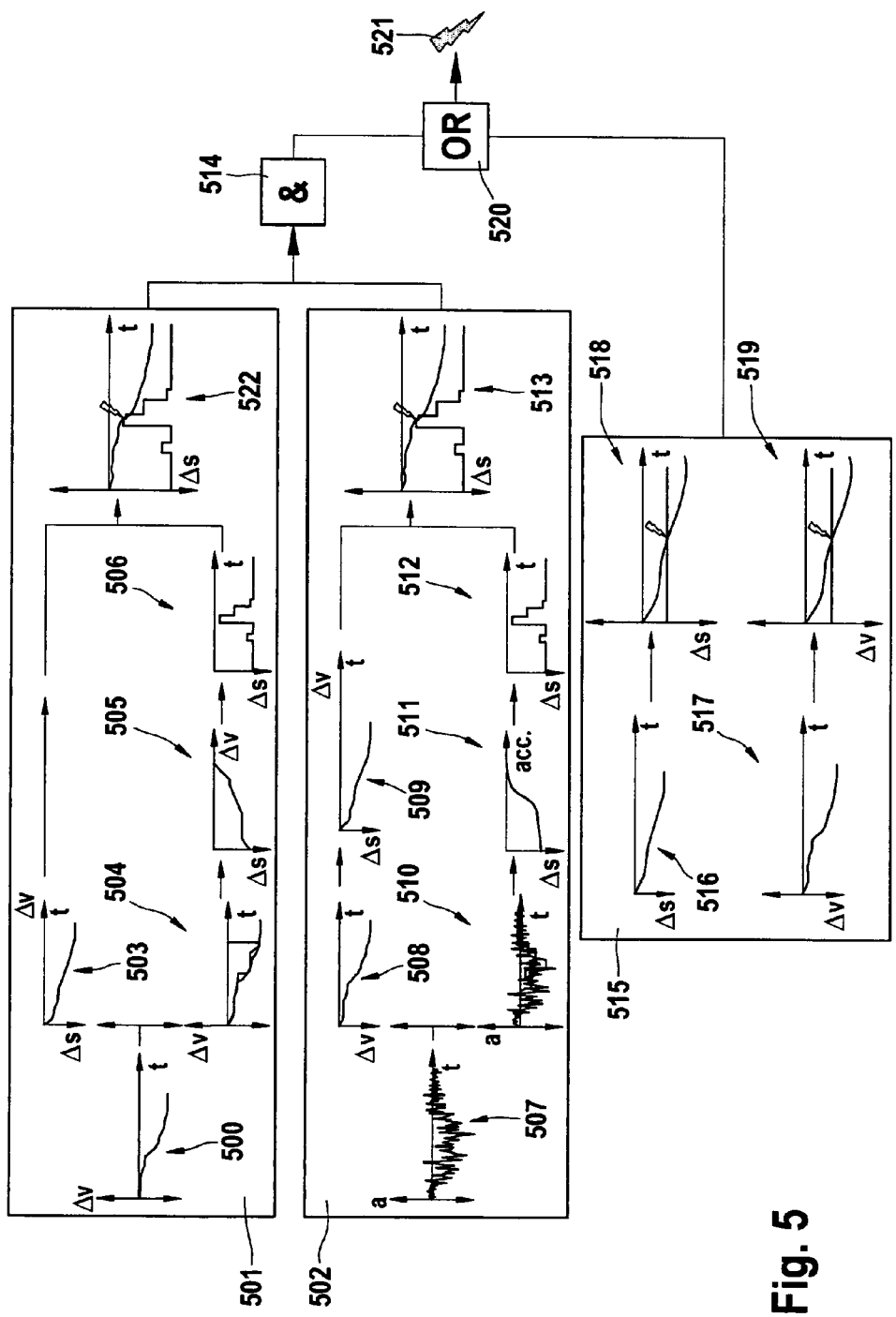
FIG. 5 shows a signal flow chart.

FIG. 5 shows the simulation of the threshold value surface by two threshold values in a signal flow diagram. In block 501, the velocity decrease is used for forming the threshold value for the forward displacement. In block 502, the deceleration is used for forming the threshold value for the forward displacement. Only if both blocks 501 and 502 show deployment is a deployment decision relayed via AND gate 514 (an OR gate is also conceivable here. The three-dimensional surface is thus approximated by a maximum or a minimum of the two surfaces formed from the characteristic lines. OR→Minimum, AND→maximum) to OR gate 520, so that a deployment decision 521 may be made. Block 515 is also provided here for the cases where the threshold value surface results in no deployment. In block 501, the velocity decrease as a function of time is first determined by integration of the deceleration. This signal is supplied to an integrator 503 to determine a forward displacement. This signal is also supplied to a filter function 504 with a holding time t. The filtered velocity decrease signal is then used for identifying the threshold value for the current velocity decrease values in a look-up table 505.

This threshold value is then provided in method step 506 for comparing it to the instantaneous forward displacement in method step 522. If the threshold value surface is at least touched, a case of deployment is present, and an appropriate signal is relayed to AND gate 514 (alternatively OR gate). The high-frequency noise signal 507 is supplied to a filter 510 and to an integrator 508 in method step 502. The filter has a holding time again in method step 510. The signal integrated once in method step 508 provides the velocity decrease, which is then integrated again to obtain the forward displacement in method step 509. The filtered signal from block 510 is then used for determining the threshold value in a look-up table in block 511.

In this look-up table, the acceleration is plotted on the x axis and the forward displacement on the y axis. The corresponding threshold value then results in block 512, which is used in block 513 for comparison with current forward displacement ΔS. If the forward displacement at least touches the threshold value, an appropriate signal, i.e., a logical one, is relayed to AND gate 514 (alternatively OR gate).

In block 515 the forward displacement in block 516 is determined from the velocity decrease, for example, by integration and compared to a fixed threshold value in block 518. In block 517 velocity decrease ΔV is determined by integration of the deceleration and also compared to a threshold value in method step 519. Cases in which the two-dimensional surface determines no deployment case are dealt with here. If a deployment case is determined in block 515, a deployment decision 521 is made in each case, because this signal goes to an OR gate, with which the output of AND gate 515 (alternatively OR gate) is compared.

What is claimed is:

1. A method for activating at least one personal protection device as a function of at least one signal derived from at least one acceleration sensor, the method comprising:
   using a forward displacement as the at least one signal;
   comparing the at least one signal to at least one threshold value surface, which is set as a function of a velocity decrease and a deceleration; and
   activating, using a processor, the personal protection device as a function of the comparison.

2. The method according to claim 1, further comprising:
   comparing the forward displacement to a first threshold value which is set as a function of the velocity decrease;
   comparing the forward displacement to a second threshold value which is set as a function of the deceleration; and
   simulating the threshold value surface as a function of the comparisons.

3. The method according to claim 1, further comprising modifying the threshold value surface as a function of at least one of (a) a signal of an applied external sensor system and (b) at least one characteristic value.

4. The method according to claim 1, further comprising modifying the threshold value surface as a function of at least one of a crash type recognition and a crash severity recognition.

5. The method according to claim 1, further comprising setting the threshold value surface as a function of a crash phase.

6. The method according to claim 5, wherein, if a predefined velocity decrease is reached, a first number indicating whether the forward displacement has reached the threshold value surface is awaited.

7. The method according to claim 1, further comprising comparing at least one of the forward displacement and the velocity decrease with a third threshold value.

8. The method according to claim 7, wherein the third threshold value is constant over time.

9. The method according to claim 1, further comprising estimating the forward displacement using an expansion into a series.

10. The method according to claim 1, wherein at least one of the steps is performed by a control unit.

11. The method according to claim 1, further comprising:
    comparing the forward displacement to a first threshold value which is set as a function of the velocity decrease;
    comparing the forward displacement to a second threshold value which is set as a function of the deceleration; and
    simulating the threshold value surface as a function of the comparisons.

12. The method according to claim 11, further comprising:
    modifying the threshold value surface as a function of at least one of (a) a signal of an applied external sensor system and (b) at least one characteristic value.

13. The method according to claim 11, further comprising:
    modifying the threshold value surface as a function of at least one of a crash type recognition and a crash severity recognition.

14. The method according to claim 11, further comprising:
    setting the threshold value surface as a function of a crash phase.

15. The method according to claim 11, wherein if a predefined velocity decrease is reached, a first number indicating whether the forward displacement has reached the threshold value surface is awaited.

16. The method according to claim 11, further comprising:
    comparing at least one of the forward displacement and the velocity decrease with a third threshold value.

17. The method according to claim 16, wherein the third threshold value is constant over time.

18. The method according to claim 11, further comprising:
    estimating the forward displacement using an expansion into a series.

19. The method according to claim 11, further comprising:
    setting the threshold value surface as a function of a crash phase; and
    comparing at least one of the forward displacement and the velocity decrease with a third threshold value;
    wherein if a predefined velocity decrease is reached, a first number indicating whether the forward displacement has reached the threshold value surface is awaited.

20. The method according to claim 19, wherein the third threshold value is constant over time.

* * * * *

UNITED STATES PATENT AND TRADEMARK OFFICE
CERTIFICATE OF CORRECTION

PATENT NO. : 8,442,723 B2
APPLICATION NO. : 10/583055
DATED : May 14, 2013
INVENTOR(S) : Koehler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1794 days.

Signed and Sealed this
Eighth Day of September, 2015

Michelle K. Lee
*Director of the United States Patent and Trademark Office*